Figures 6, 7, 9:
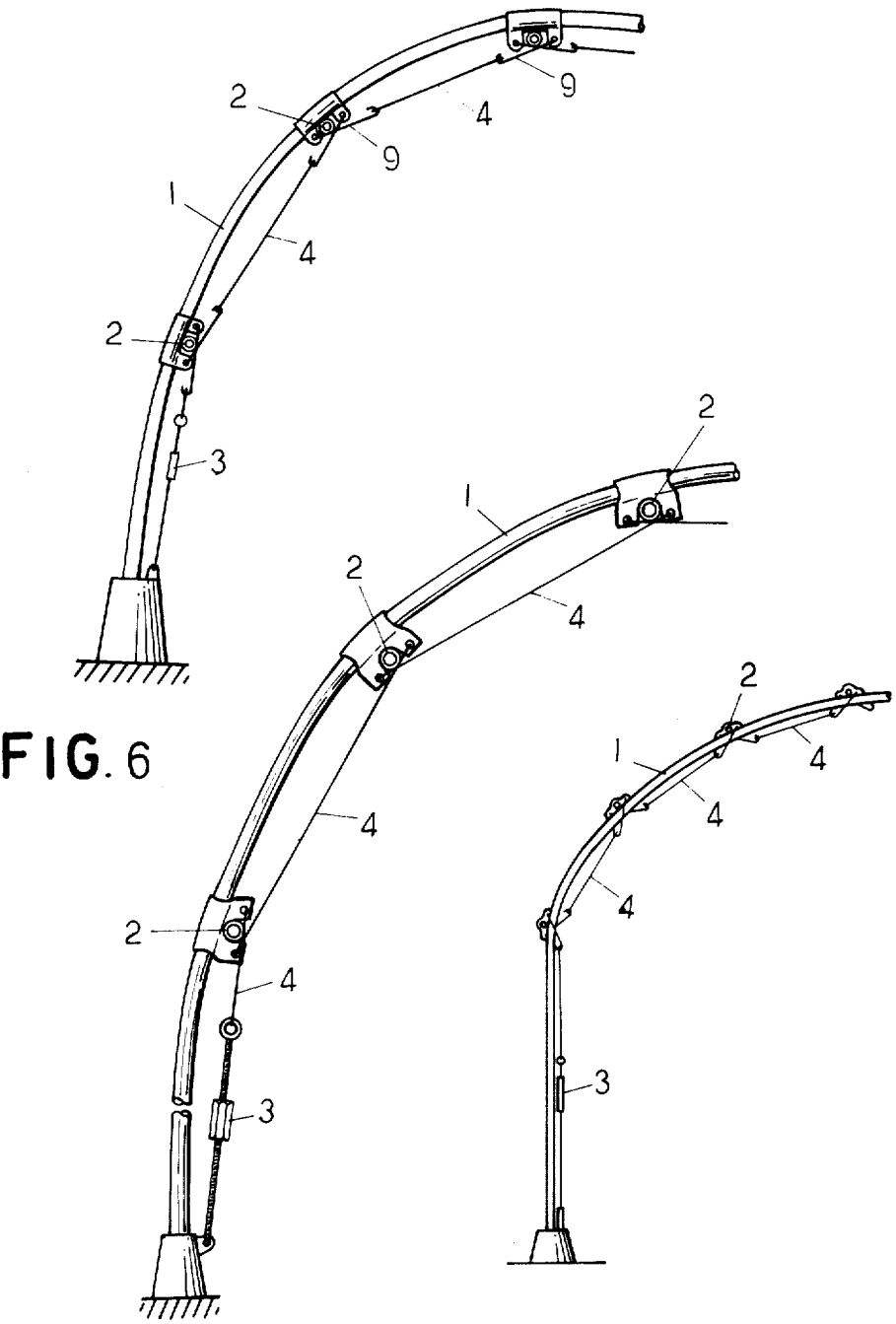
Figure 14:
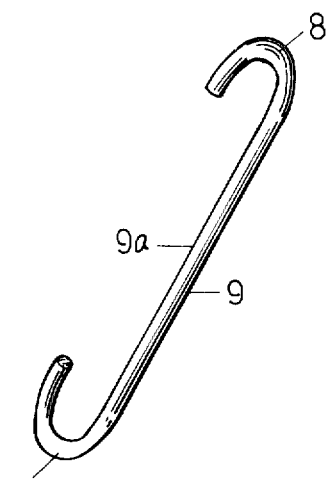

United States Patent

Utahara

[11] 3,897,622
[45] Aug. 5, 1975

[54] FIXING METHOD AND FIXING APPARATUS FOR FIXING TOGETHER BEND PIPE AND STRAIGHT PIPE OF A PIPE HOUSE AT THEIR INTERSECTING POINTS

[76] Inventor: Motoo Utahara, 1-24-7, Okusawa, Setagaya-ku, Tokyo, Japan

[22] Filed: Oct. 2, 1973

[21] Appl. No.: 402,798

[52] U.S. Cl.................. 29/452; 52/86; 52/223 R
[51] Int. Cl......................................... B21d 39/00
[58] Field of Search......... 52/86, 223, 639; 29/452, 29/428, 433, 241

[56] References Cited
UNITED STATES PATENTS

| 126,323 | 4/1872 | Parker | 52/86 |
|---|---|---|---|
| 1,074,895 | 10/1913 | Rapp | 52/86 |
| 1,253,763 | 1/1918 | Zahner | 52/86 |
| 1,264,578 | 4/1918 | Sweeney | 52/223 R |
| 1,359,948 | 11/1920 | Babek | 52/223 R |
| 1,976,188 | 10/1934 | Nozawa | 52/86 |
| 2,126,413 | 8/1938 | Respess | 52/86 |
| 2,561,581 | 7/1951 | Macerata | 29/452 |
| 3,708,944 | 1/1973 | Miyake | 52/86 |

*Primary Examiner*—C. W. Lanham
*Assistant Examiner*—James R. Duzan
*Attorney, Agent, or Firm*—Oblon, Fisher, Spivak, McClelland & Maier

[57] ABSTRACT

A plurality of arch bend pipes are erected in order to make a dome-like pipe house, which is used for agricultural purposes. A plurality of straight pipes are fixed to the frame structure of the pipe house so as to cross the bend pipes with the intersecting points of the both pipes being firmly fixed. An improved fixing method for the intersecting points and an improved fixing apparatus for both pipes of the points and the end portions of the bend pipes and base members or the ground are provided. The fixing devices or fittings are mounted on the bend pipe and tensed by means of a connecting means such as wire and a tensioning device is mounted at least on the end portion of the connecting means. When the tensioning device is operated, a plurality of fixing devices function at the same time in order to tense or loosen the tensioning device. At the end portions of the bend pipe, a fixing or securing device is mounted, which is adapted to prevent any movement of the bend pipes during the tensioning of the intersecting pipes. The securing device is cooperatively connected to the tensioning device, so that as the tensioning device is effectively operated, both ends of the bend pipe are firmly secured to the ground or base member.

14 Claims, 34 Drawing Figures

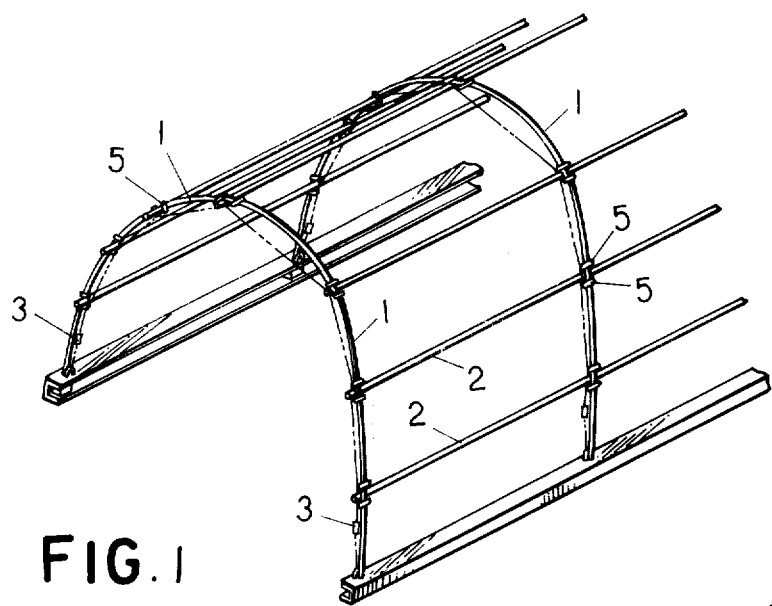
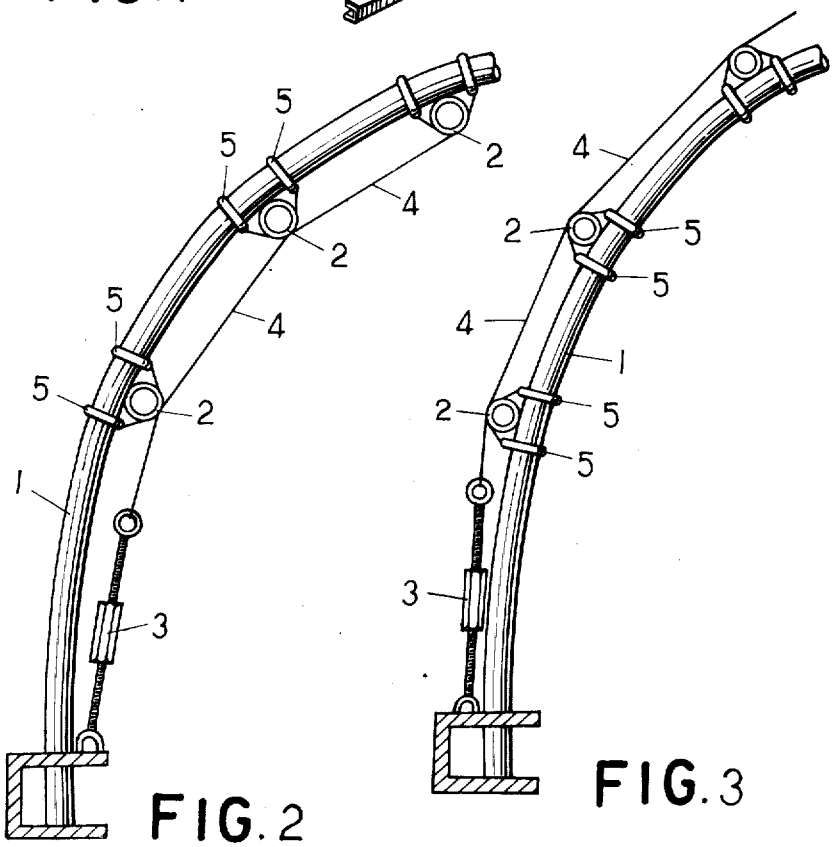
FIG. 1
FIG. 2
FIG. 3

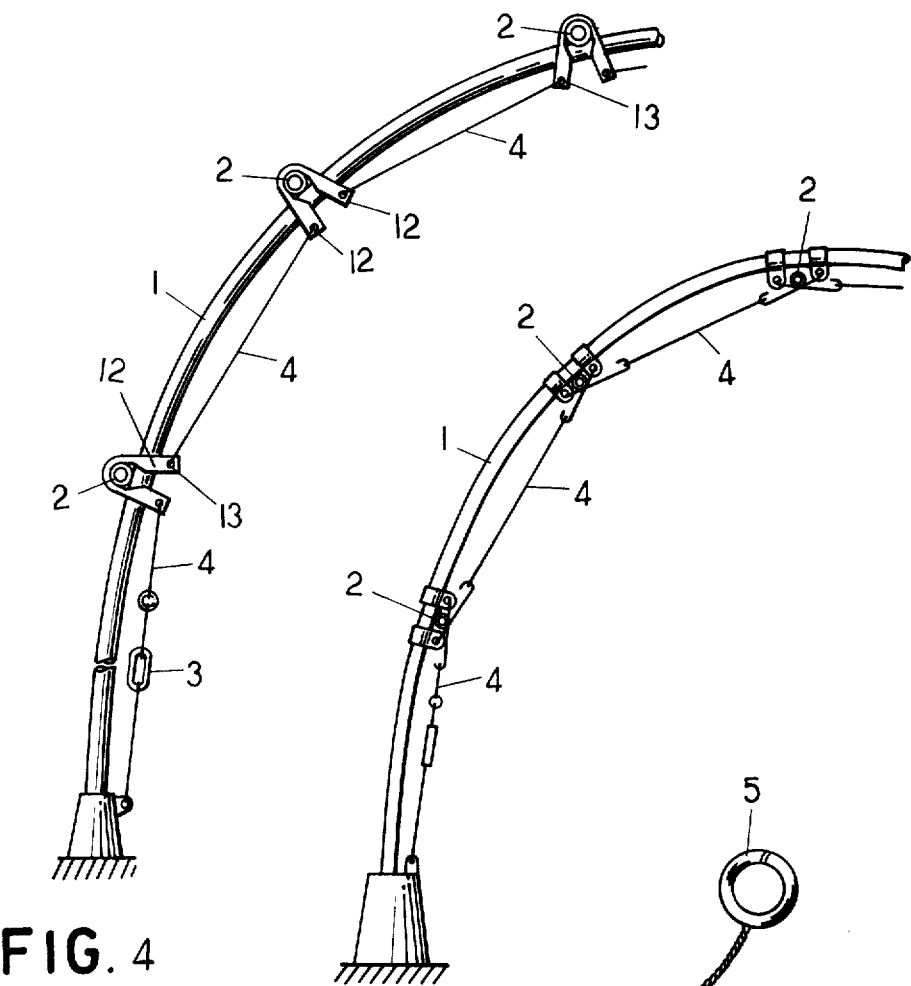
FIG. 4
FIG. 5
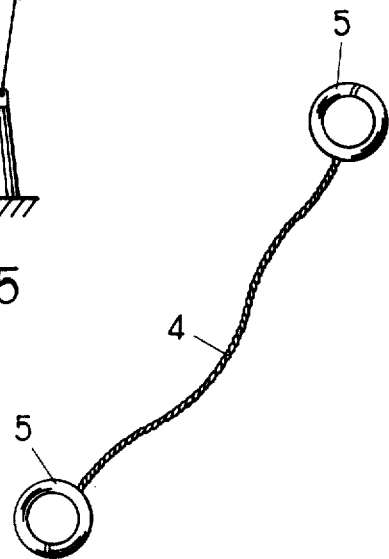
FIG. 11

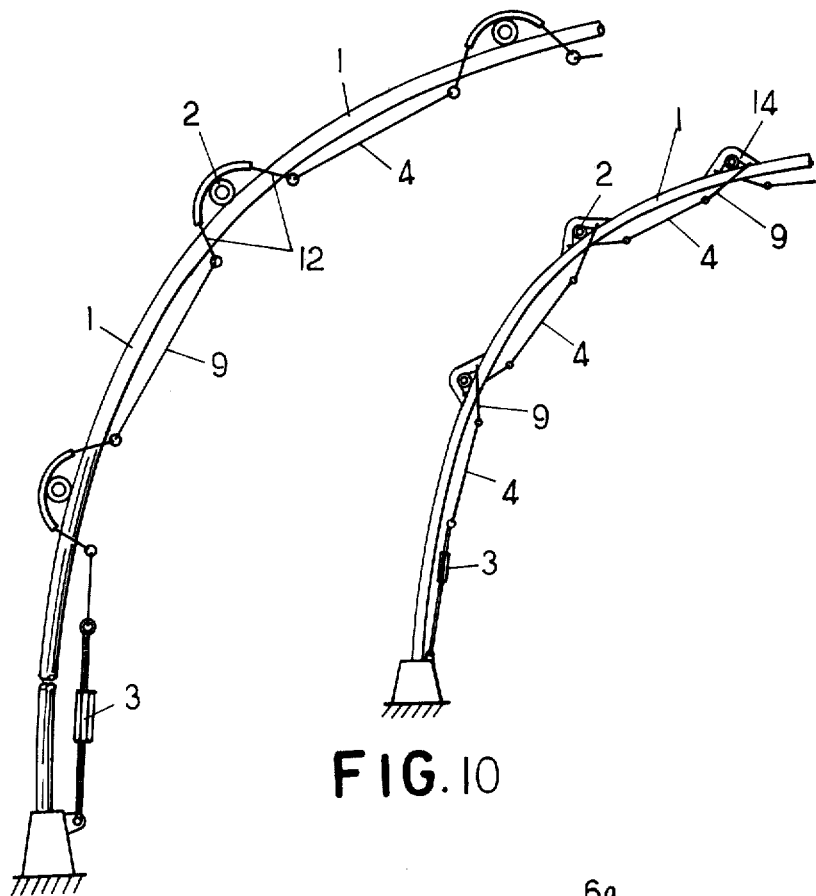
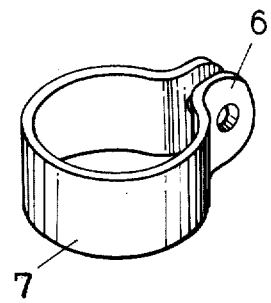
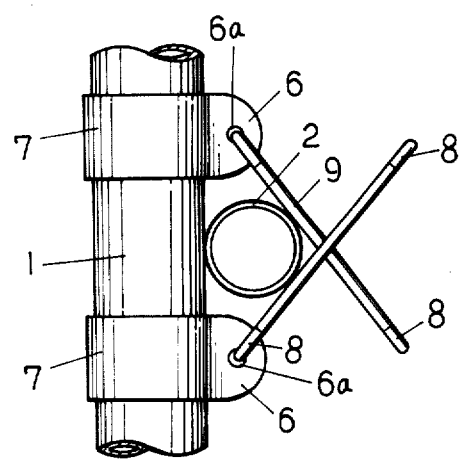

FIXING METHOD AND FIXING APPARATUS FOR FIXING TOGETHER BEND PIPE AND STRAIGHT PIPE OF A PIPE HOUSE AT THEIR INTERSECTING POINTS

SUMMARY OF THE INVENTION

Nowadays, in order to construct a frame structure of a pipe house composed of a plurality of bend pipes and a plurality of straight pipes, both end portions respectively of the bend pipe are buried under the ground or fitted to the base members arranged in parallel with each other along the ground. Then, the bend pipe and the straight pipe are mutually fixed by means of a cross joint and a fastener. In case the bend pipe and straight pipe are arranged in the same plane, they are mutually fixed by a cross joint. In order to fix the straight pipe to the bend pipe situated along the lower edge of the frame structure of the pipe house, they are fixed with each other by a three-way pipe. In case the bend pipe and straight pipe are crossed and arranged one over the other, the crossing portions of the bend pipe and straight pipe respectively are mutually fastened by a steel band or wire band wound around the crossing portions and secured by means of bolts and nuts.

Accordingly, it is necessary for the crossing portions of the bend pipes and straight pipes of a pipe house to be individually secured so that the construction work of the pipe house is laborious. Additionally, in accordance with the conventional construction procedure or method of constructing a pipe house, only the crossing portions of the bend pipe and straight pipe are fixed with each other. As a result, when the whole frame structure of pipe house erected is flapped in a strong wind and a concentrated stress or load is applied to the particular crossing on fixing portion of the bend pipe and straight pipe, the particular fixing portion may be broken and the pipe house collapsed or destroyed.

One object of the present invention is to provide a new fixing method and fixing device for fixing bend pipe to straight pipe of a pipe house, which method and device are improved so as to avoid the above-mentioned shortcomings of the conventional fixing methods and devices.

According to the fixing method and device of the present invention, the specific fixing devices or fittings situated on the intersecting portions of the bend pipe and straight pipe are connected with each other with a connecting means such as wire or rod extending substantially in parallel with the bend pipe. In order to tense and unloosen the connecting means, tensioning devices are installed at the end portions of the wire or rod and the tensioning devices are connected to the bend pipe fixing members such as the base member of the pipe house. In consequence of the operation of the tensioning device, a plurality of fixing devices or fittings are tensed or unloosened, so that the pipe house is easily erected or constructed and disassembled. The fixing devices are fitted around the bend pipe or the members of the fixing device are applied on the inside and outside of the bend pipe without any fastening work of bolts and nuts for the fixing device and consequently any fastening tool. Furthermore, according to another advantage of the present invention, the numbers of working steps to erect and to disassemble the pipe house may be decreased and consequently the erecting and disassembling work can be economically done. Said tensioning devices are connected to the base member for fixing the end portions of the bend pipe, thus the more tightly the connecting means is tensioned the more firmly the bend pipe is fixed. Consequently, there is no fear of the bend pipe coming out from the ground or coming off of the base member, so that a strong frame structure of the pipe house is obtained. Furthermore, the fixing device co-operates with the tensioning device without any tool for operating the fixing device. The fixing devices or fittings and the connecting means of the frame structure thus constructed are not fixed by means of bolts and nuts, so that the fixing devices and the connecting means are integrally operated with the bend pipe and the straight pipe as strengthening members of the frame structure and they also have some flexibility. Consequently, the stress generated in the frame structure thus erected due to a gale is evenly distributed to all construction members of the pipe house, thus the pipe house can with-stand the gale or storm.

Further objects and advantages of the present invention will be apparent from the following description and accompanying drawings.

In the drawings:

FIG. 1 is a perspective view of a part of the frame structure of the pipe house constructed according to the present invention, FIG. 2 is an enlarged front view of a part of the frame structure, FIG. 3 is an enlarged front view similar to FIG. 2, in which the straight pipe is layed on the bend pipe.

Figure 15:
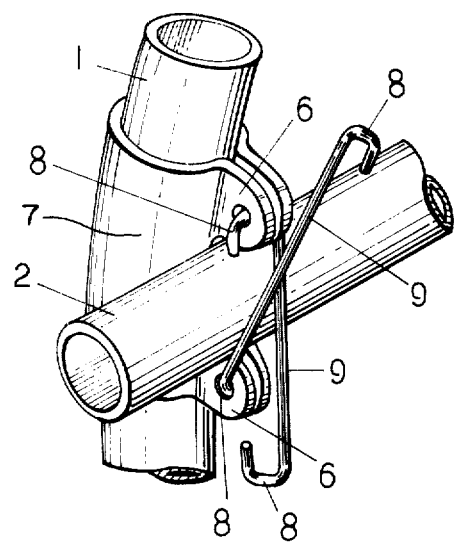
Figure 16:
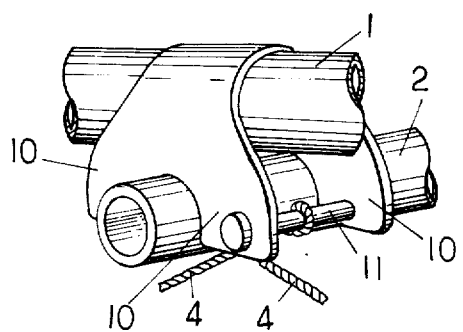
Figure 17:
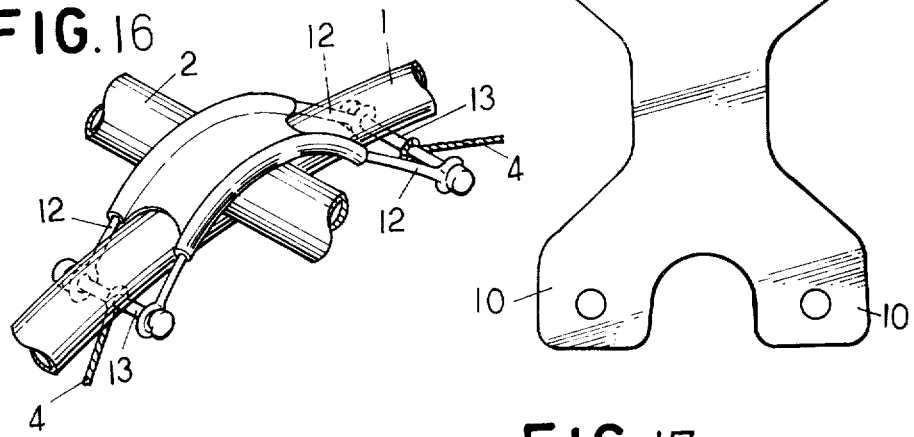
Figure 26:
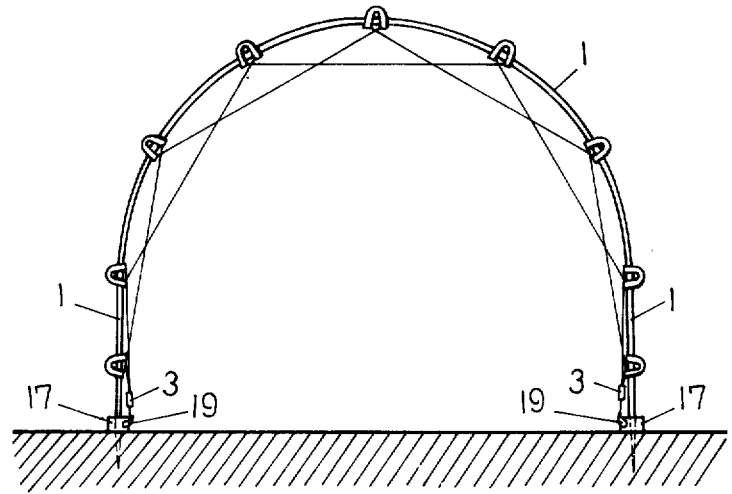
Figure 27:
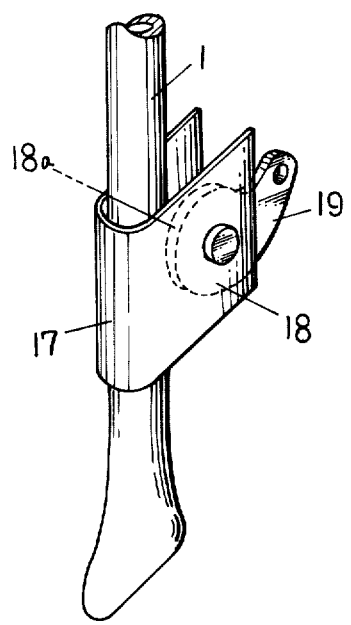
Figure 28:
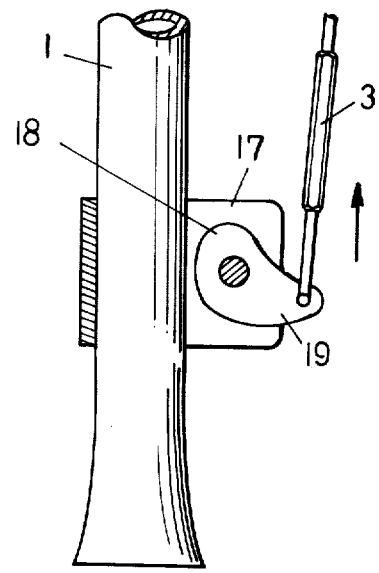
Figure 29:
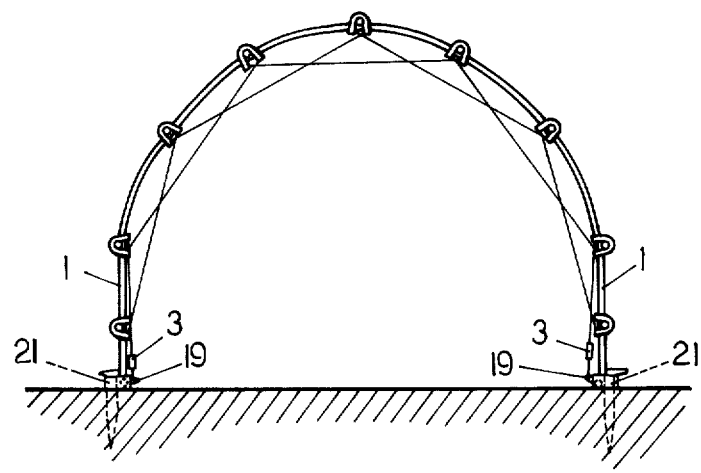
Figure 30:
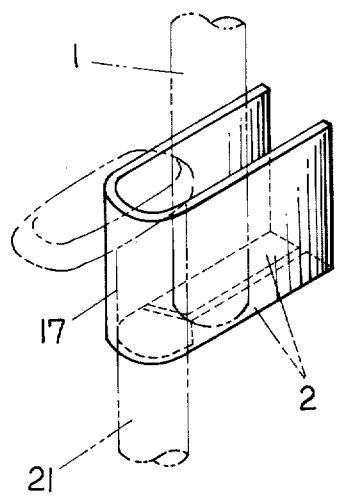
Figure 31:
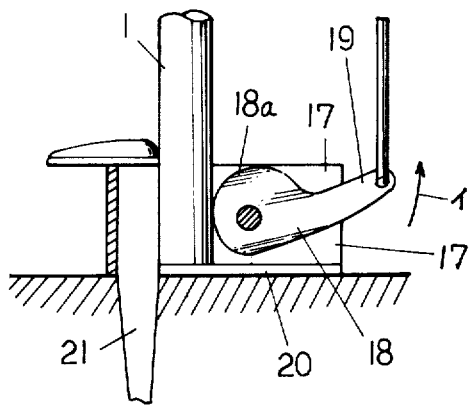
Figure 32:
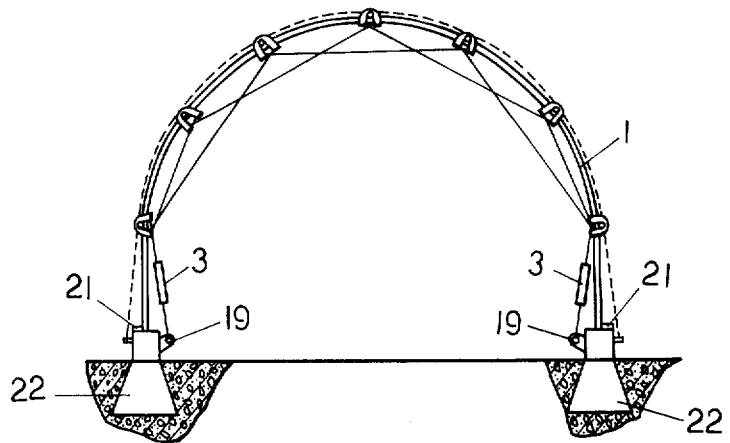
Figure 33:
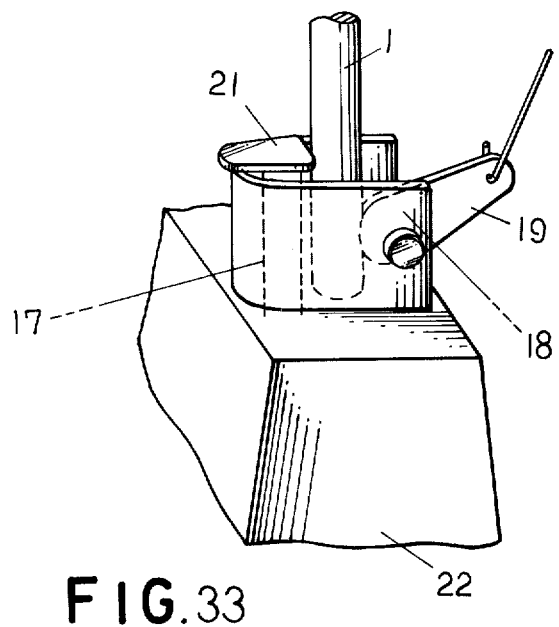
Figure 34:
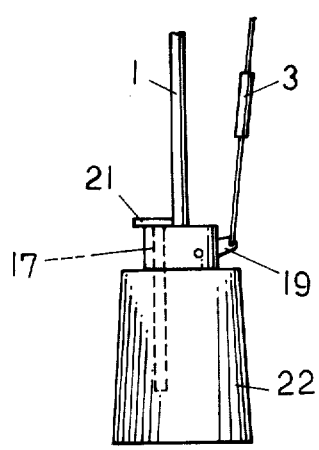

FIGS. 4 – 10 are enlarged front views showing how to fix the straight pipe to bend pipe crossing with the straight pipe, FIG. 11 shows a most simple configuration of the fixing device and connecting device, FIGS. 12 – 15 show other modifications respectively of the devices of FIG. 11, FIG. 16 shows a further modification of the device of FIG. 15, FIG. 17 is a development plan view of the device of FIG. 16, FIGS. 18 – 29 are views of fixing devices and associated parts used to fix the straight pipe to the bend pipe placed on the under side of the straight pipe, FIGS. 30 and 31 show other modifications of the fixing devices of FIGS. 26 – 28 and, FIGS. 32–34 show other modifications of the fixing devices used to connect the bend pipe to a base member.

Referring to FIGS. 2 – 4, in the frame structure of the pipe house shown in FIGS. 2 – 4, the arch shaped bend pipe 1 fixed to the base through its end portions are fixed to the straight pipe 2 intersecting with the bend pipe 1. Fixing devices or fittings are placed on the intersecting portions of the bend pipe and the straight pipe and connecting means for mutually connecting the fittings extended substantially in parallel with the bend pipe 1.

As is apparent from the drawings, turn buckles are installed to the end portions of the connecting means and the connecting means are tensed by the operation of the turn buckles, so that a plurality of fixing devices are tensed at one time. That is, due to the tensioning operation of the connecting means, the bend pipe is pulled outwardly and the fixing devices are pulled, so as to press the straight pipe 2 to the bend pipe 1 and fix the interesting portions of both pipes. Also, the connecting means itself is tensed and operates as a strengthening member of the pipe house. As already indicated, any fastening devices such as bolts and nuts are not needed to be installed on the fixing devices or fittings placed on the intersecting portions of the pipes. During the construction work of the frame structure of the pipe house, the fixing devices are merely applied on one side of the straight pipe, consequently the pipe house can be erected easily, simply and economically.

The assembling method and the fixing devices of the present invention will be described in detail in the following description.

The most simple configurations of the fixing devices and the connecting means have rings 5, 5 formed of steel and the like which are connected to the end portions of wire 4 of the connecting means as shown in FIG. 11. In order to construct the frame structure of a pipe house according to the present invention using the fixing devices and the connecting means shown in FIG. 11, a number of pairs of two rings 5, 5 fitted to the wires 4, 4 respectively are successively disposed about the bend pipe 1. The number of pair of rings is determined correspondingly to the number of straight pipes to be installed to the pipe house. During the construction work of the frame structure, the wires 4, 4 respectively having two rings 5, 5 intersect with each other at the lower portion or upper portion of the bend pipe 1 and then the straight pipe 2 is placed between the intersecting wires 4, 4 so as to tense the wires by means of turnbuckles 3 fitted on the end portions of the wires. That is, owing to the tensioning of the wires 4, a plurality of the straight pipe 2 arranged on the bend pipe 1 are pressed onto the bend pipes 1, thus both pipes 1 and 2 are firmly fixed.

It will be appreciated that the straight pipe and the bend pipe of the frame structure are firmly assembled by means of rings 5 having a simple shape and construction. Consequently, the ring constituting a fixing device is made economically. It is possible to construct the rings 5 so as to be openable and/or the wires 4 to be disconnectable in order to make the placing operation of the rings 5 onto the bend pipe 1 easy.

Another embodiment shown in FIGS. 12 and 13 employs two sleeves 7, 7 having a stop plate 6 instead of the ring 5 and still another embodiment shown in FIG. 15 uses one sleeve 7, a hook portion 8 of the tensioning bar 9 being hooked to each stop plate 6. The hook portions 8, 8 of the tensioning bar 9 extend bend along the same direction of pipe 1. The tensioning bars 9, 9 intersect one another on the lower portion of the bend pipe in order to support the straight pipe 2 (see FIGS. 13 and 15).

It is observed that the advantage of such fixing device resides in the tensioning direction of the wire 4. Since the hook portions 8, 8 of the tensioning bars 9, 9 are reversely bent and extend along the same direction of pipe 1, so as to mutually face each other the wire 4 can in effect be tensed along the center line between the bend pipe 1, when the hook portions are hooked to the openings 6a, 6a of the stop plates without any interference of the stem portions 9a, 9a of the tensioning bars 9, 9. Consequently, during the construction of the frame structure of the pipe house, the bend pipe 1 advantageously does not deviate from the centerline. Furthermore, since the tensioning bars 9, 9 are adapted to be made separately from the sleeves 7, 7, the supporting operation of the straight pipe 2 is accomplished easier than the supporting operation of the straight pipe using the rings 5.

In still another embodiment of FIG. 16, the fixing device is merely bent in a U-shape instead of making it sleeve-like in order to embrace the bend pipe 1 and straddle the straight pipe 2 with legs 10, 10 of the fixing device, pins 11, 11 are inserted through the legs 10, 10 situated at the both sides of the straight pipe 2 and wires 4, 4 connected to the pins 11, 11 intersect one another under the bend pipe 1 in order to support the straight pipe 2. Consequently, the straight pipe 2 is fixed to the bend pipe 1 so as to form a predetermined space, the distance of the space being determined by the length of the wire 4. Also, such fixing device shown in FIG. 16 is made or manufactured by a pressing process which is easier than the manufacturing method of the sleeve-like fixing device shown in FIGS. 12 and 13.

In the fixing device and associate members used to fix the bend pipe 1 and straight pipe 2 arranged on the bend pipe 1 shown in FIGS. 18 – 29, the bend pipe 1 supports the straight pipe 2, so that the wires 4, 4 do not always intersect one another. The greatest advantage of such fixing device resides in the arrangement of the legs 12, 12 of the fixing device firmly embracing the straight pipe 2 at both sides of the bend pipe 1 and the connection of wires 4 to the pins 13, 13 inserted through the legs 12, 12. Accordingly, the frame structure of a pipe house can be erected at ease. In order to erect the frame structure using the fixing device, first place the fixing device on the intersecting portions of the bend pipe 1 and straight pipe 2 and then sequentially fix the fixing device to the intersecting portions of them, and finally operate turnbuckles 3 placed on the end portions of the wires 4 so as to tense the wires.

Comparing the fixing work of a pipe house using such fixing devices with the fixing operation wherein wires 4, 4 or tensioning bars 9, 9 intersect one another as shown in FIGS. 2, 3, 5, 6 and 7, the former does not need to presupport the straight pipe 2 and consequently the erection work is easily done and the wire 4 does not deviate sideways during the tensioning of the wire since the bend pipe 1 is embraced by the legs 12, 12. Accordingly, the stress is evenly distributed throughout the whole construction of the frame structure of a pipe house. In the fixing device or fitting having a most simple construction used in the fixing apparatus shown in FIG. 19, bendable bars are situated at both edges of a thin metal plate and inserted through the edge portions and pins 13, 13 are inserted through the extruded end portions of the bendable bars. In the embodiment shown in FIG. 21, the legs 12 are integrally formed at the four corners of a thin metal plate. The former device shown in FIG. 19 has a considerable elasticity, so that the erection work is easily done. As is apparent from the drawing of FIG. 21 showing one construction of a fixing device, the fixing device is manufactured by a press or die casting, so that the shape of the fixing device is widely selected and economically obtained.

Figure 18:
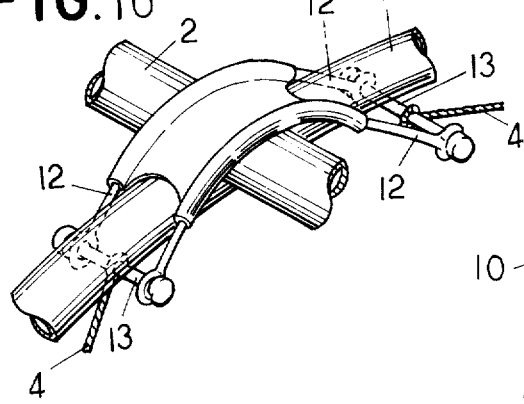
Figures 19, 20:
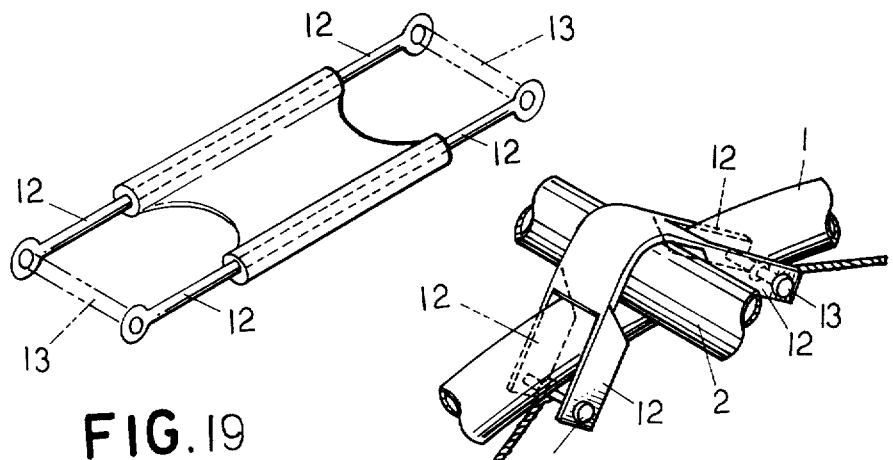
Figures 21, 22:
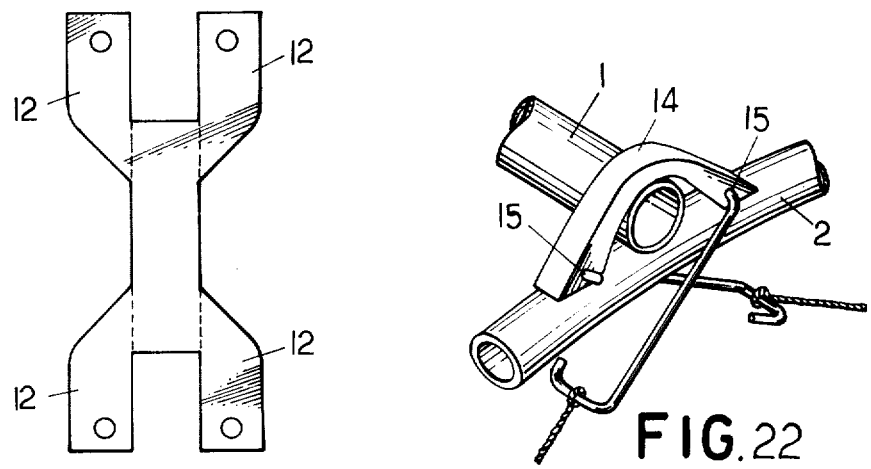
Figure 23:
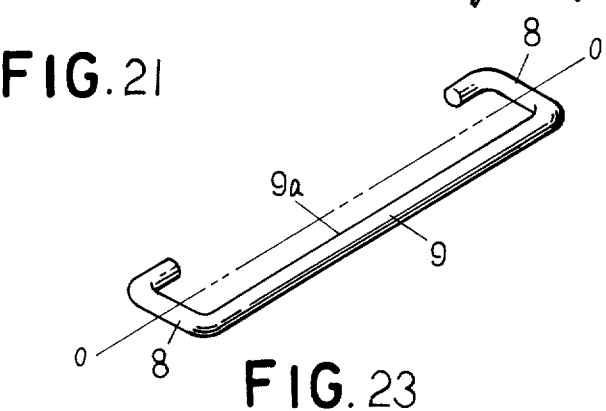
Figures 24, 25:
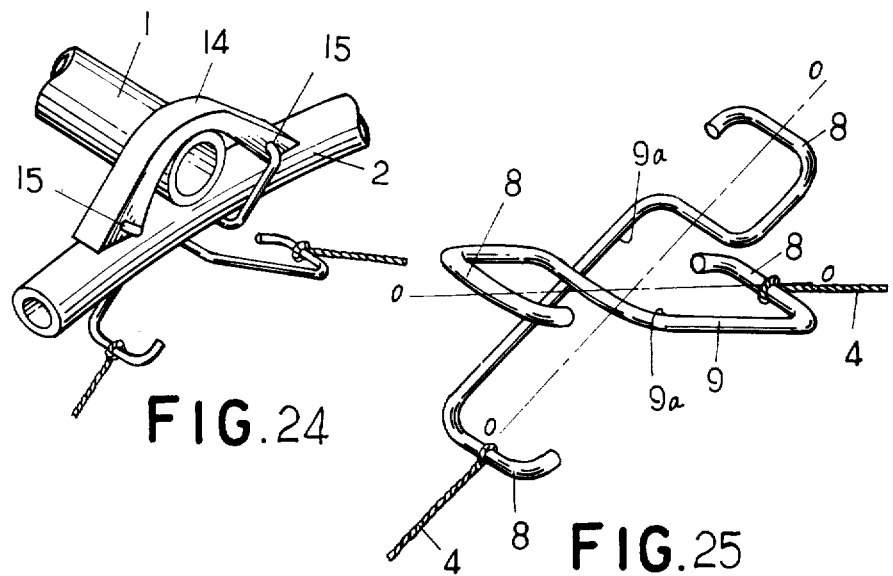

The fittings of the fixing device shown in FIGS. 18 – 20 was further improved and the simpler construction of the fitting shown in FIGS. 22 - 24 was obtained. The fixing devices or fittings 14, 14 of a fixing apparatus of FIGS. 22 – 24 do not have legs 12, 12 and they are merely placed on the straight pipe 2. The hook portions 8, 8 respectively of the tensioning bars 9, 9 are hooked to the engaging openings 15, 15 of the fixing device 14.

The tensioning bars 9, 9 respectively placed on the intersecting portions of the bend pipe 1 and straight pipe 2 are connected to one another by means of the wire 4 as shown FIGS. 9 and 10. Due to the simple construction of such fixing device 14, it is made easily and economically. However, such fixing devices 14 can not control the side movement of the bend pipe 1 during the tensioning of the wires. In order to prevent the fixing device 14 from deviating sideways, some means is provided on the tensioning bars 9, 9. As is apparent from FIGS. 23 and 25, the hook portions 8, 8 formed on both end portions of the tensioning bars 9 are bent in the same plane, so as to place center line 0 - 0 of the hooks 8, 8 along a straight line. During a hooking operation of the fixing device 14 to the tensioning bars 9, 9, either of the hook portions 8, 8 is hooked or engaged to the engaging openings 15, 15 formed in the end portions respectively of the fixing device 14 and the center line 0 — 0 substantially corresponds to the center line of the bend pipe 1. Consequently, when the wires 4 and the tensioning bars 9 are tensed along the bend pipe 1, the fixing device 14 is prevented from deviating sideways.

It is understood that in cases where the hook portions 8, 8 are bent in the same direction or in opposite directions, it is or not necessary to make a mutual interference of the stem portions 9a, 9a of the intersecting bars 9, 9.

While the fixing method and the fixing device or joint of the interference portions of the bend pipe 1 and the straight pipe 2 constituting the frame structure of a pipe house according to the present invention have been described in conjunction with the drawings of FIGS. 1 - 25, only the fixing device of the bend pipe 1 will now be described in detail.

As already explained, during the erecting work of the frame structure of a pipe house, bend pipe 1 tends to move outwardly as a result of the tension created by means of a connecting means such as wire 4 arranged along the bend pipe 1 and such force is balanced by the tensioning force of the connecting means. That is, a reaction force corresponding to the tensioning force of the wire is generated on the end portion of the bend pipe 1, which reaction force has a component of force. The component of force points upwards, and the bend pipe 1 is apt to be pulled out from the ground or the base member. Consequently, in order to firmly erect the frame structure of a pipe house according to the conventional method it is necessary for both end portions of a bend pipe to be firmly connected to the two base members arranged in parallel. Also, when any base member is not employed, the end portions of the bend pipe 1 should be sharpen so as to be deeply driven into the ground. However, many difficulties arise in case the ground is muddy or soft for when a pipe house is constructed on muddy ground, the end portions of a bend pipe tend to spring out from the ground. In case base members are used, the fitting work for the base members to the muddy ground is very difficult.

According to the present invention, the connecting means such as wire is connected to the fixing device having a cam and is mounted to the end portions of the bend pipe 1. The base portion of the bend pipe 1 is adapted to be pressed downwards, which pressing force corresponds to the tensioning force, during the tensioning operation of the connecting means. Consequently, with or without the base member employed, the bend pipe 1 can be firmly fixed at the specific place. FIGS. 26 - 28 show the fixing apparatus without any base member. In the embodiments of the fixing apparatus shown in FIGS. 26 - 28, the end portions of the bend pipe 1 are embraced by the fixing means 17 having a U-shape. A cam 18 is mounted on the fixing means as shown in FIG. 28 so as to be placed inside of a bend pipe 1 and the cam 18 is connected to an end portion of the connecting means by means of an arm 19 thereof. Thus, as the wire is pulled or tensed, the cam is pressed onto the bend pipe 1. Therefore, the turnbuckle 3 mounted on the tensioning means such as wire as shown in FIG. 28 is turned in order to tense the tensioning means and the cam 18, thus the arm 19 is pulled upwards as shown by the arrow in FIG. 28, so that another cam face 18a contacts with the inside face of the bend pipe 1 and presses it downwardly. The downward pressing force prevents the bend pipe 1 from being pulled up, which upward force is generated by tensioning of the connecting means. Consequently, the bend pipes are firmly erected in the ground, even if the ground is muddy and a base member is not employed. Another embodiment of fixing means is that of FIGS. 29 - 31. The fixing means is obtained by integrally forming a bottom plate to the fixing means 17 of U-shape as above-mentioned in order to embrace a pile 21 instead of the base portions or end portions of the bend pipe 1. According to such fixing apparatus, it is not necessary for the end portion of the bend pipe to be worked upon. Ordinarily, the bend or bent pipe is long, so that it is troublesome for work men to handle the pipe.

That is, the frame structure of a pipe house can be erected by easily driving rather small piles 21 and again the labourous treatment work on the long bend pipe 1 is not needed. Therefore, the cost of erection work is considerably decreased. The fixing means shown in FIGS. 29 - 31 has the cam as shown in FIGS. 27 and 28, which cam functions as explained in conjunction with the embodiment of FIG. 28. The lower end of the bend pipe 1 is restricted downwardly by means of the bottom plate 20. The embodiment of a fixing device used to the bend pipe 1, which pipe is adapted to a base member 22 is shown in FIGS. 32 34. In the embodiment, the upper surface of the base member 22 instead of the bottom plate 20 shown in FIGS. 30 and 31 is used to restrict the downward movement of the bend pipe. When an opening for inserting the end portion of the bend pipe 1 is formed in the base member 22, a pile is not always necessary.

As is apparent from the description of the embodiments of the fixing device described in conjunction with FIGS. 26 - 34, the fixing method according to the present invention comprises the steps of spreading out of the bend pipe 1 and pressing down the right and left end portions of the bend pipe 1 by means of a cam 18, so as to balance the pulling out force applied to the bend pipe 1. Consequently, the bend pipe 1 is firmly fixed and also the pipe house is made to have a simple configuration. The pipe house of the present invention is easily and economically constructed even if some base member is used.

As already described, in order to fix the intersecting portions of the arch bend pipe and the straight pipe of a frame structure of a pipe house, the erecting method and fixing apparatus according to the present invention is embodied or employed using no fastening parts such as bolts and nuts and associate tool wrenches. Consequently, the number of construction steps and employed members or materials is remarkably reduced compared to conventional methods and thus the frame structure of a pipe house can be economically erected and great industrial advantage obtained.

With reference to the covering sheet mounted on the frame structure of a pipe house, the sheet is made of transparent film which is light permeable and is spread on the outside of the frame structure. As already described, all bend pipes of the frame structure are sprung out, thus, when the sheet is made of a hard film having little stretchability, the sheet itself advantageously becomes a strengthening member of the pipe house and compensates for the reaction force. Additionally, when the sheet is held down from the outside by means of steel wire, the extensible sheet such as vinyl chloride can be used as the covering sheet on the pipe house.

I claim:

1. A method of constructing a framework structure of a pipe house which includes a plurality of axially spaced arch bend pipes and a plurality of axially extending straight pipes interconnecting said arch bend pipes, comprising the steps of:

respectively securing the end portions of said plurality of bend pipes to the ground or a base member so as to form a dome;

supporting said plurality of straight pipes against said plurality of bend pipes upon the interior or exterior surfaces of said bend pipes;

mounting a plurality of fixing devices at the intersection points of said bend pipes and said straight pipes in such a manner that said fixing devices are secured upon portions of said bend pipes disposed upon opposite sides of said straight pipes;

interconnecting said plurality of fixing devices by connecting means which extend between said intersection points and substantially along said bend pipes and arranging said connecting means at said intersection points so as to intersect with each other upon one side of said bend pipes and define with said bend pipes intersection spaces within which said straight pipes are respectively disposed and supported; and tensioning said connecting means so as to press and fixedly secure said straight pipes to said bend pipes.

2. Apparatus for constructing a framework structure of a pipe house comprising:

a plurality of axially spaced arch bend pipes the respective end portions of which are secured within the ground;

a plurality of axially extending straight pipes mounted upon the interior or exterior side of said bend pipes and intersecting the same so as to define intersection points therewith;

a plurality of fixing devices, disposed at said intersection points of said bend pipes and said straight pipes, secured upon portions of said bend pipes which are disposed upon opposite sides of said straight pipes;

connecting means, extending between said intersection points and substantially along said bend pipes for interconnecting said plurality of fixing devices, and intersecting with each other upon one side of said bend pipes at said intersection points so as to define with said bend pipes intersection spaces within which said straight pipes are disposed and supported; and tensioning means for tensioning said connecting means, whereby said straight pipes will be pressed toward and fixedly secured relative to said bend pipes.

3. Apparatus as set forth in claim 2, wherein:
said fixing devices are ring members; and
said connecting means are wires.

4. Apparatus as set forth in claim 2, wherein said fixing devices comprise:

web members disposed upon one side of said bend pipes and having four legs connected thereto and arranged in pairs, said legs extending to the opposite side of said bend pipes; and support means interconnecting said legs of each pair for attachment to said connecting means.

5. Apparatus as set forth in claim 2 wherein:
said fixing devices comprise split ring members having aperture means defined therein; and said connecting means comprise tensioning bars having hooked portions at both ends thereof, the hooked portions at one end thereof being secured to said apertures of said split ring members while the hooked portions at the other end thereof are secured to wires extending between and interconnecting said tensioning bars disposed at one of said intersection points with said tensioning bars disposed at another one of said intersection points.

6. Apparatus as set forth in claim 2 wherein:
said fixing devices straddle said bend pipes; and
said connecting means comprise tensioning bars having hooked portions at both ends thereof and intersecting one another upon one side of said straight pipes;

the hooked portions at one end of said tensioning bars being connected to said fixing devices while the hooked portions at the other end of said tensioning bars are connected to wires extending between and interconnecting said tensioning bars disposed at one of said intersection points with said tensioning bars disposed at another one of said intersection points.

7. Apparatus as set forth in claim 2, wherein each of said fixing devices comprises:

legs integrally formed upon said fixing devices and defining therewithin groove means having a configuration which corresponds to the circumferential configuration of said straight pipes and within which said straight pipes are disposed; and support pin means interconnecting said legs for attachment to said connecting means.

8. Apparatus as set forth in claim 2, wherein each of said fixing devices comprises:

a substantially rectangular metal plate;
a pair of bars secured to and extending along the longitudinal edges of said metal plates; and
support pin means interconnecting said bars for attachment to said connecting means.

9. Apparatus as set forth in claim 2, wherein each of said fixing devices comprises:

a substantially rectangular metal plate;
pairs of legs secured to said metal plate; and
support pin means interconnecting said legs for attachment to said connecting means.

10. Apparatus as set forth in claim 2, wherein:

said fixing devices are mounted upon said straight pipes so as to straddle said bend pipes and include means defining apertures therewithin; and said connecting means comprise tension bars having hooked portions at both ends thereof which extend within the same direction and which are disposed so as to intersect one another upon one side of said straight pipes, the hooked portions at one end of said bars being disposed within said apertures while the hooked portions at the other end of said bars are adapted to be connected to said connecting means extending between said intersection points.

11. Apparatus as set forth in claim 2, wherein:

said fixing devices are mounted upon said straight pipes so as to straddle said bend pipes and include means defining apertures therewithin; and said connecting means comprise tension bars having hooked portions at both ends thereof which extend in opposite directions with respect to each other and which are disposed so as to intersect one another upon one side of said straight pipes, said hooked portions being co-planar and having their centerlines disposed within a straight line, the hooked portions at one end of said bars being disposed within said apertures while the hooked portions at the other end of said bars are adapted to be connected to said connecting means extending between said intersection points.

12. Apparatus as set forth in claim 2 further comprising:

U-shaped fixing means embracingly secured to said end portions of said bend pipes; and a pivotable lever secured to said U-shaped fixing means, one end of said lever being connected to said connecting means and another end of said lever comprising cam means which is adapted to abut and bias said respective end portion of said bend pipe toward the closed portion of said U-shaped fixing means, whereby said lever will be pivoted when said connecting means is tensed by said tensioning means so as to secure said bend pipes within said ground.

13. Apparatus as set forth in claim 2, further comprising:

plate means for supporting said end portions of said bend pipes and integrally formed with U-shaped fixing means enbracingly securing said end portions of said bend pipes;

pile means disposed through said U-shaped fixing means and adapted to be inserted within the ground, said pile means being interposed between said end portions of said bend pipes and the closed portion of said U-shaped fixing means; and a pivotable lever secured to said U-shaped fixing means, one end of said lever being connected to said connecting means and another end of said lever comprising cam means which is adapted to abut and bias said respective end portion of said bend pipe toward said pile means, whereby said lever will be pivoted when said connecting means is tensed by said tensioning means so as to secure said pipes within said ground.

14. Apparatus as set forth in claim 2, further comprising:

a base member disposed within said ground for supporting said end portions of said bend pipes;

U-shaped fixing means secured to said base member and embracing said end portions of said bend pipes;

pile means disposed through said U-shaped fixing means and secured within said base member, and interposed between said end portions of said bend pipes and the closed portion of said U-shaped fixing means; and a pivotable lever secured to said U-shaped fixing means, one end of said lever being connected to said connecting means and another end of said lever comprising cam means which is adapted to abut and bias said respective end portion of said bend pipe toward said pile means, whereby said lever will be pivoted when said connecting means is tensed by said tensioning means so as to secure said bend pipes within said base member.

* * * * *